(12) United States Patent
Detlefs (10) Patent No.: US 8,145,817 B2
(45) Date of Patent: Mar. 27, 2012

(54) READER/WRITER LOCK WITH REDUCED CACHE CONTENTION

(75) Inventor: David L. Detlefs, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 379 days.

(21) Appl. No.: 12/430,903

(22) Filed: Apr. 28, 2009

(65) Prior Publication Data

US 2010/0275209 A1   Oct. 28, 2010

(51) Int. Cl.
*G06F 12/00* (2006.01)
*G06F 13/00* (2006.01)
*G06F 9/46* (2006.01)

(52) U.S. Cl. ........ 710/200; 711/152; 711/163; 718/100; 718/102; 718/108

(58) Field of Classification Search .................. 710/200; 711/152; 718/100, 102, 108
See application file for complete search history.

(56) References Cited

U.S. PATENT DOCUMENTS

| | | | | |
|---|---|---|---|---|
| 5,802,582 | A * | 9/1998 | Ekanadham et al. | 711/152 |
| 6,574,654 | B1 * | 6/2003 | Simmons et al. | 718/104 |
| 6,601,120 | B1 * | 7/2003 | Schimmel | 710/107 |
| 6,823,511 | B1 | 11/2004 | McKenney et al. | |
| 6,836,887 | B1 | 12/2004 | Such | |
| 6,990,560 | B2 * | 1/2006 | Armstrong et al. | 711/152 |
| 7,047,245 | B2 * | 5/2006 | Jones | 1/1 |
| 7,107,267 | B2 * | 9/2006 | Taylor | 1/1 |
| 7,228,391 | B2 | 6/2007 | Silvera et al. | |
| 7,308,539 | B2 | 12/2007 | Fuhs et al. | |
| 7,380,073 | B2 * | 5/2008 | Shorb | 711/152 |
| 7,430,627 | B2 | 9/2008 | McKenney | |
| 7,647,443 | B1 * | 1/2010 | Chatterjee et al. | 710/200 |
| 7,711,909 | B1 * | 5/2010 | Lev et al. | 711/156 |
| 7,730,491 | B2 * | 6/2010 | Kukanov et al. | 718/108 |
| 7,844,973 | B1 * | 11/2010 | Dice | 718/108 |
| 7,934,062 | B2 * | 4/2011 | McKenney et al. | 711/147 |
| 2006/0168585 | A1 | 7/2006 | Grcevski et al. | |
| 2007/0067774 | A1 | 3/2007 | Kukanov et al. | |
| 2010/0042997 | A1 * | 2/2010 | Lev et al. | 718/100 |
| 2010/0241774 | A1 * | 9/2010 | Olszewski et al. | 710/200 |
| 2010/0332766 | A1 * | 12/2010 | Zeffer et al. | 711/144 |
| 2010/0333096 | A1 * | 12/2010 | Dice et al. | 718/102 |

(Continued)

OTHER PUBLICATIONS

"Scalable Reader-Writer Locks for Parallel Systems", by Wilson C. Hsieh and William E. Weihl; Dated Nov. 1991; 18 pages.*

(Continued)

*Primary Examiner* — Brian Misiura
(74) *Attorney, Agent, or Firm* — Boswell IP Law; J. Mason Boswell (57) ABSTRACT

A scalable locking system is described herein that allows processors to access shared data with reduced cache contention to increase parallelism and scalability. The system provides a reader/writer lock implementation that uses randomization and spends extra space to spread possible contention over multiple cache lines. The system avoids updates to a single shared location in acquiring/releasing a read lock by spreading the lock count over multiple sub-counts in multiple cache lines, and hashing thread identifiers to those cache lines. Carefully crafted invariants allow the use of partially lock-free code in the common path of acquisition and release of a read lock. A careful protocol allows the system to reuse space allocated for a read lock for subsequent locking to avoid frequent reallocating of read lock data structures. The system also provides fairness for write-locking threads and uses object pooling techniques to make reduce costs associated with the lock data structures.

19 Claims, 7 Drawing Sheets

U.S. PATENT DOCUMENTS

2011/0138135 A1* 6/2011 Dice et al. ............. 711/152

OTHER PUBLICATIONS

"Scalable Reader-Writer Synchronization for Shared-Memory Multiprocessors", by John M. Mellor-Crummey and Michael L. Scott; Dated 1991; 8 pages.*

"Hybrid Transactional Memory to Accelerate Safe Lock-based Transactions", by Vallejo et al.; No Date Provided; 9 pages.*

"Towards fair, scalable, locking", by Vallejo et al.; Dated Apr. 6, 2008; 6 pages.*

Krieger, et al., "A Fair Fast Scalable Reader-Writer Lock", Retrieved at <<http://ieeexplore.ieee.org/stamp/stamp.jsp?arnumber=4134208&isnumber=4134171>>, Proceedings of the International Conference on Parallel Processing, ICPP 1993, pp. II-201-II-204.

Akhter, et al., "Understanding and Avoiding Memory Issues with Multi-core Processors", Retrieved at <<http://www.ddj.com/embedded/212400410>>, Dec. 11, 2008, pp. 4.

"ReaderWriterLock Alternative", Retrieved at <<http://www.codeplex.com/ReaderWriterLockAlt>>, Jan. 15, 2009, pp. 2.

Vallejo, et al., "Towards Fair, Scalable, Locking", Retrieved at <<http://www.atc.unican.es/~enrique/Publications/Epham08%20-%20Towards%20Fair,%20scalable,%20locking.pdf>>, pp. 6.

* cited by examiner

READER/WRITER LOCK WITH REDUCED CACHE CONTENTION

BACKGROUND

In multi-threaded programs running on multiprocessors, different threads may attempt to access shared data structures concurrently. Such access is generally coordinated via some form of locking: all threads acquire a lock before accessing the data structure (and hold the lock for the duration of the access). The simplest form of locking is mutual exclusion—only one thread at a time can hold the lock, so only a single thread is accessing the data structure at a time. However, in many cases one can classify the operations performed on the data structure as readers and/or writers; reader operations only read the data structure, but writer operations may update it. Several reader operations may safely run concurrently, but only one writer operation may safely run at a time. Therefore, it is useful to reflect this in the locking primitives, and the concurrent programming literature has long had the concept of reader/writer locks. Such a lock can either be acquired in read (or shared) mode, or write (or exclusive) mode—several threads may acquire the lock in read mode, but only one thread may acquire the lock in write mode. Thus, a reader/writer lock can protect a shared data structure, and when operations on the data structure have been classified as reader or writer operations, they can acquire the lock in the corresponding mode. For many shared data structures, it is common for reader operations to be much more frequent than writer operations, so that reader/writer locks allow significantly greater parallel scalability.

It is common for computers today to have many more processing cores than computers of just a few years ago. Where once computers with more than 2-4 cores were only found in database servers or supercomputers, even desktop computer systems can be ordered today with eight or more processor cores. The increased number of processors increases the sharing of resources such as memory, and exacerbates inefficient use of such resources, including cache faults caused by multiple processors modifying the same data.

Unfortunately, the most common implementations or reader/writer locks include a single variable that tracks the number of readers, and sometimes a separate variable that tracks writers. With many readers executing code on different processors, the reader/writer lock itself can quickly become a source of cache contention. For example, one common strategy in reader/writer lock implementations is to maintain a variable representing the number of threads that have acquired the lock in read mode, updating this count variable with atomic hardware instructions. This causes cache contention, as each processor that updates the count acquires the cache line containing the count variable in exclusive mode. As the number of processors in a machine increases, contention on even one cache line can severely limit performance. The impact of contention is determined partly by the rate at which processors access the contended cache line. If N processors each execute a loop in which they acquire a read lock to execute a read operation, the rate at which the read lock is acquired, and thus the shared cache line is accessed, will depend on the duration of the operation executed within the lock—the shorter the operation, the greater the contention. Thus, whereas for exclusive locks software developers generally increase parallelism by doing less inside locks, for reader/writer locks developers often receive paradoxical guidance, recommending increases in parallelism by doing more inside locks.

SUMMARY

A scalable locking system is described herein that allows processors in a multiprocessor system to access shared data with reduced cache contention to increase scalability. The system provides a reader/writer lock implementation that reduces contention in scenarios in which a shared data structure is accessed in a read-only manner. The scalable lock system uses randomization and spends extra space to spread possible contention over multiple cache lines. Instead of a single variable for tracking the number of readers, the system uses multiple lock counts spread over multiple cache lines. Carefully crafted invariants allow the use of partially lock-free code in the common path of acquisition and release of a read lock. A careful protocol allows the system to reuse space allocated for a read lock for subsequent locking to avoid frequent reallocating of read lock data structures. The system avoids updates to a single shared location in acquiring/releasing a read lock by spreading the lock count over multiple sub-counts in multiple cache lines, and hashing thread identifiers to those cache lines. The system also provides fairness for write-locking threads: a thread wishing to acquire a write lock cannot be "starved" for arbitrary periods by read-locking threads. In addition, the system uses object pooling techniques to make the space/allocation/initialization costs associated with the lock data structures acceptable. Thus, the system provides a more highly scalable reader/writer lock, particularly for the level of parallelism provided by modern multi-processor computer systems.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A scalable locking system is described herein that allows many processors in a multiprocessor system to access shared data with reduced cache contention to increase scalability. The system provides a reader/writer lock implementation that reduces contention in scenarios in which a shared data structure is accessed in a read-only manner (or nearly so). Using the techniques described herein, frequent reader operations performed on a shared data structure by multiple threads receive increased scalability, without requiring programmers to worry about the size of the operations. The scalable lock system uses randomization and spends extra space to spread possible contention over multiple cache lines. Instead of a single variable for tracking the number of readers, the system uses multiple lock counts spread over multiple cache lines. For example, the system may use a lock count per processor or other dividing scheme. Carefully crafted invariants allow the use of partially lock-free code in the common path of acquisition and release of a read lock. A careful protocol allows the system to reuse space allocated for a read lock for subsequent locking to avoid frequent reallocating of read lock data structures. For example, the system may optimistically assume that the next request will be a read lock request after the last read lock has been released.

The system has the following attributes, in some embodiments. First, the system avoids updates to a single shared location in acquiring/releasing a read lock by spreading the lock count over multiple sub-counts in multiple cache lines, and hashing thread identifiers to those cache lines. Second, the system provides fairness for write-locking threads: a thread wishing to acquire a write lock cannot be "starved" for arbitrary periods by read-locking threads. The system does this by providing a locking protocol through which a write-locking thread can prevent further read-lock acquisition, thus inserting itself "in line" to acquire the write lock when the current read-lock holders release the lock. Third, the system uses object pooling techniques to make the space/allocation/initialization costs associated with the lock data structures acceptable. Thus, the system provides a more highly scalable reader/writer lock, particularly for the level of parallelism provided by modern multi-processor computer systems.

The system implements the reader/writer lock as a queue of "nodes," each representing the interest in one or more threads in acquiring the lock. A "writer" node represents one thread attempting to acquire the lock in write (exclusive) mode, a "reader" node one or more threads attempting to acquire the lock in read (shared) mode. The lock object contains pointers to the head and tail of this queue, and the nodes contain pointers to the next node in the queue. The thread or threads at the head of the queue currently hold the lock; new nodes are inserted after the current tail.

The major difference with previous work is in the representation of a reader node. Let N be a number equal to (or proportional to) the number of processors on the machine. A reader node contains an array of size N, each of whose elements is initialized to point to a structure containing a lock count. This structure is lockable and contains sufficient padding bytes to ensure that multiple such structures allocated sequentially have lock and count fields on different cache lines. Abstractly, the read lock is held if the head node of the queue is a reader node, and the sum of the count fields of the structures within the reader node is non-zero. To obtain the read lock, a thread uses its hash code to choose a structure from the array, and obtains the lock on that object. It then checks the "next" field of the reader node—if this is non-null, then another thread wishes to obtain a write lock, and the reader thread enqueues after that writer. However, if it is null, then the thread can acquire the read lock by incrementing the count field of the chosen structure.

When a write locking thread successfully enqueues a writer node after a reader node, it has closed off further read locking via that node. It also counts the number of non-zero counts in the structures in the array, and waits for its node to become the head. The last reader thread, the one that decreases the aggregate lock count to zero, wakes up the waiting writer thread.

Figure 1:
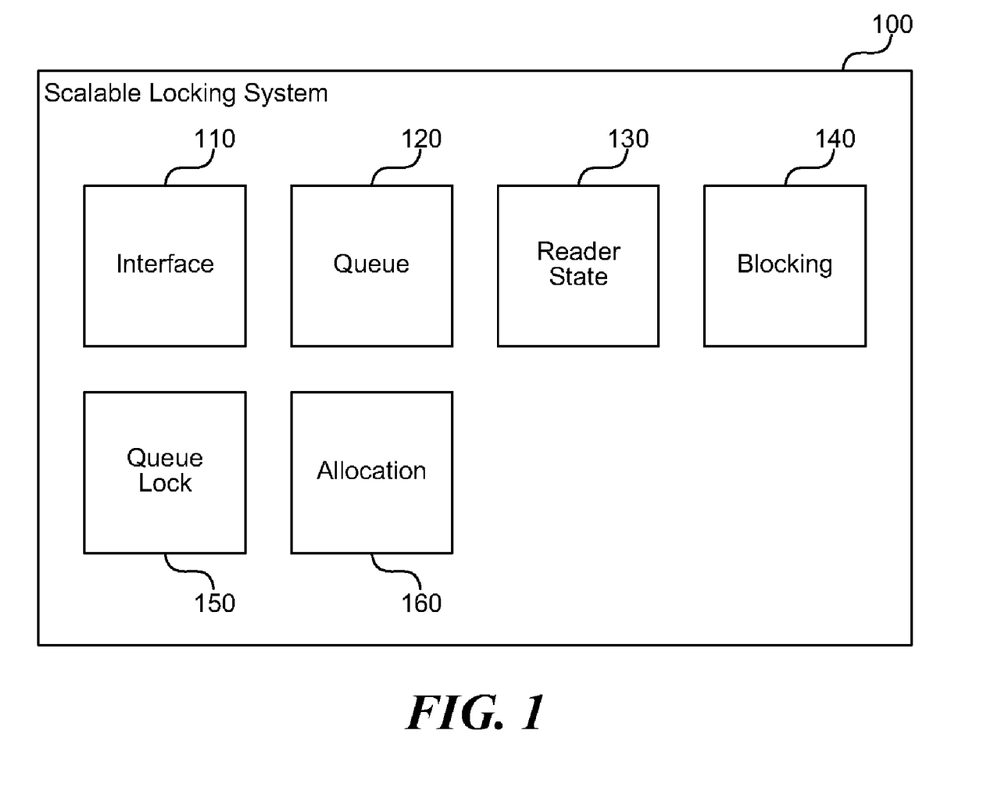
FIG. 1 is a block diagram that illustrates components of the scalable locking system, in one embodiment.

FIG. 1 is a block diagram that illustrates components of the scalable locking system, in one embodiment. The system 100 includes an interface component 110, a queue component 120, a reader state component 130, a blocking component 140, a queue lock component 150, and an allocation component 160. Each of these components is described in further detail herein.

The interface component 110 provides an interface to application code and receives requests to acquire and release locks in both a read mode and a write mode. The interface component 110 may provide a programmatic interface to applications through Microsoft .NET, the Microsoft Component Object Model (COM), or other common interface paradigms. The interface component 110 provides a class or other interface with one or more functions or application programming interfaces (APIs) that an application can invoke to use the facilities of the system 100 described herein.

The queue component 120 maintains a list of reader and writer nodes that represent requests to acquire a lock and any current holder of the lock. For example, the head of the list may currently hold the lock and each subsequent node in the list may represent a next in line request to receive the lock when the current holder of the lock releases the lock. Because the scalable lock system 100 uses a queue-based locking approach, the system 100 provides a lock that is inherently fair. Fairness in locking terminology means that one type of request (e.g., readers) will not starve or prevent another type of request (e.g., writers) from acquiring the lock. The queue component 120 ensures that requestors will acquire the lock in roughly the order that they request the lock. The queue component 120 also responds to requests within the system 100 to inspect the current head or tail of the list, add new reader or writer nodes to the list (e.g., upon a new acquire request), remove nodes from the list (e.g., upon a release request), and so forth.

The reader state component 130 maintains an indexed list of reader lock counts for one or more reader nodes in the list maintained by the queue component 120. The indexed list is structured so that lock counts are distributed with enough space (e.g., padding) between each count so that accessing a lock count at one index location is associated with a different cache line than accessing a lock count at any other index location. This prevents cache contention when, for example, a thread running on one processor modifies a lock count because of acquiring or releasing a read lock. The reader state component 130 may distribute the lock counts according to many different schemes, such as by creating one lock count per processor, creating a number of lock counts based on a number of threads using the lock, or other variations that appropriately reduce cache contention for a particular application of the scalable lock system 100.

The blocking component 140 allows threads to block waiting for the lock efficiently and wakes threads when a particular thread has acquired the lock. The blocking component 140 may provide some amount of spinning (e.g., testing a lock value in a loop to optimistically acquire the lock without blocking) before putting a thread to sleep to be woken when the lock is available. Too much spinning can waste processor resources, while too little spinning can lead to unnecessary delay in acquiring the lock. The block component 140 may allow applications or administrators to tune the amount of spinning, such as by setting a threshold number of spin loop iterations. When the lock is released by a current lock holder, the blocking component 140 wakes a thread of the next node in the list maintained by the queue component 120, indicating that the thread has the lock.

The queue lock component 150 is a lock that protects internal data members of the system 100. The queue lock component 150 may be a single lock or may include several layers of granularity of locks within the data structures of the system 100. For example, a main lock data structure may have a lock for protecting its data members along with individual data structures associated with indices within the indexed list maintained by the reader state component 130. The system 100 avoids locking internal members, particular in common code paths that are designed to reduce cache contention and promote a high degree of parallelism. However, in some cases internal locking maintains the integrity of lock data members potentially being accessed by many threads at once.

The node allocation component 160 allocates new reader and writer nodes for inclusion on the list maintained by the queue component 120. The node allocation component 160 may implement common techniques in the art to provide efficient creation and destruction of nodes. For example, the component 160 may provide an object pool of reader and/or writer nodes that other components can quickly reuse as the system 100 receives new lock requests.

The computing device on which the scalable locking system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Note that as used herein, the term processor refers to a particular execution unit, typically with an associated cache. Modern trends are moving toward including many processor cores on a single processor chip. Each of these cores represents a processor as described herein, and the scalable lock system may provide a lock count associated with each processor core. Thus, when referencing situations with multiple processors herein, these situations include a single processor chip with multiple cores, multiple processor chips (each potentially having multiple processor cores), and so forth. In addition, other processing units such as a graphical processing unit (GPU) having one or more cores or operating in conjunction with a central processing unit (CPU) may be used with the facilities of the system described herein to provide reduced contention locking of data.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
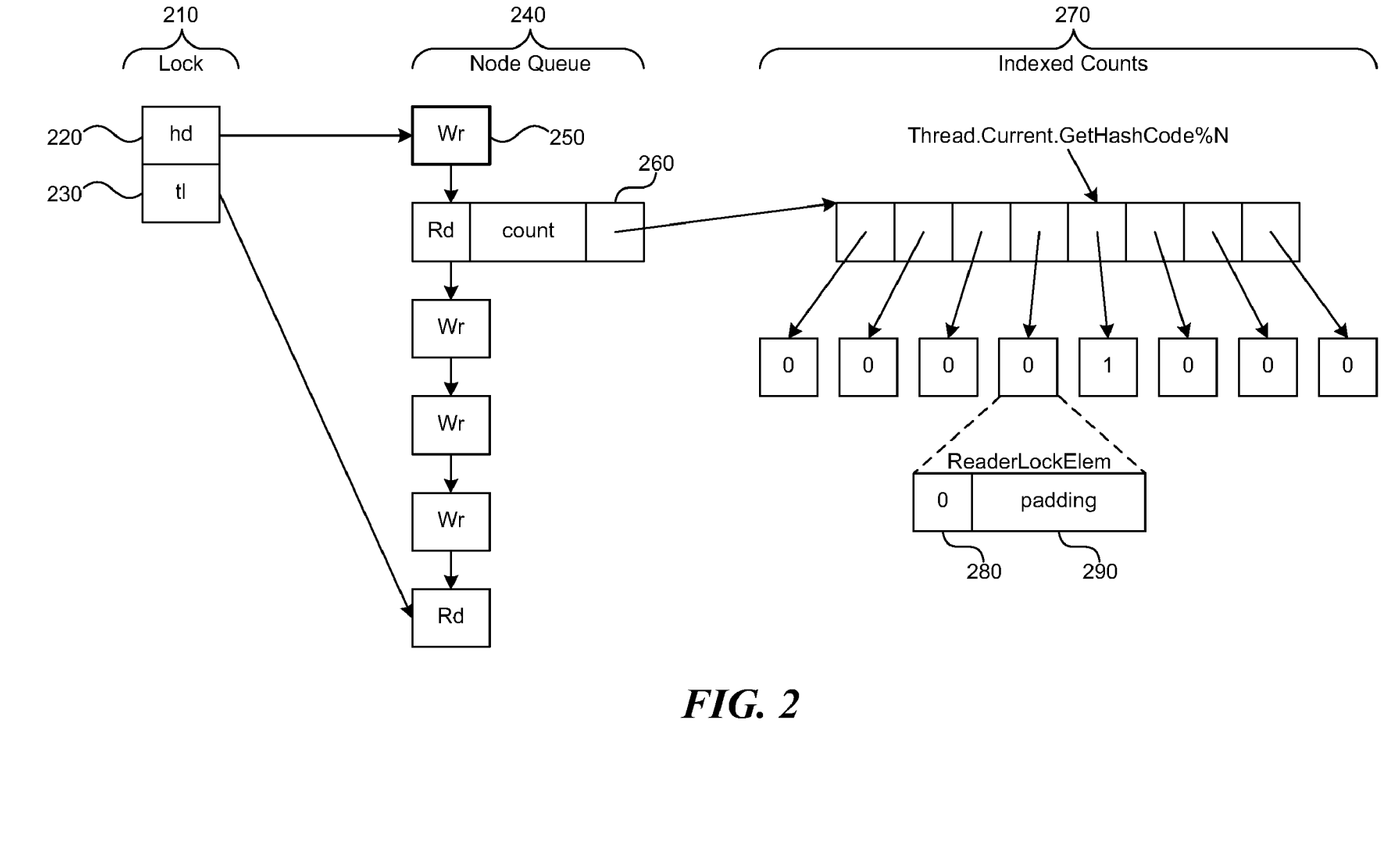
FIG. 2 is a block diagram that illustrates various data structures allocated by the scalable lock system when the system is in use, in one embodiment.

FIG. 2 is a block diagram that illustrates various data structures allocated by the scalable lock system when the system is in use, in one embodiment. The diagram includes a main lock data structure 210 that includes a head pointer 220 and a tail pointer 230 that point to the head and tail respectively of the node list 240 maintained by the queue component. The head of the node list typically holds the lock (except for an optimization related to a last reader node where the lock is not currently held, as described further herein), and subsequent nodes represent readers and/or writers added to the list in an order in which each requested the lock. As shown, the node list 240 includes a writer node 250 at the head of the list followed by a reader node 260. While the writer node 250 represents a single writer, the reader node 260 may represent one or multiple readers. Note that a reader node at the head of the queue may also represent zero readers if no one holds the lock and the reader node remains on the queue waiting for the next reader to request the lock. This increases performance by avoiding deallocation of an unused reader node only to reallocate it in the common case of a subsequent request for the read lock. The reader node 260 references a series of indexed counts 270 the total of which represents the number of readers currently holding the lock (or requesting the lock when the reader node 260 is not at the head of the node list 240). The indexed counts 270 each comprise a data structure that includes a count 280 and padding 290. The padding separates each count 280 so that each count is in or is likely to be in a separate cache line of one or more processors. Many previous read/write lock implementations rely on a single reader count on which each processor in a multi-processor system contends, often rendering the lock less useful than intended. By providing multiple lock counts, potentially one or more per processor, the scalable lock system reduces the amount of contention and allows more efficient use of the lock in the common case of many more readers than writers acquiring the lock.

The diagram also shows that in a read-only workload, the queue will include only a single reader node. Threads will add themselves as read lockers by choosing an index into the array of indexed counts, and then increment the lock count of the chosen element. If the number of elements is on the order the number of processors on the machine, and the threads spread the accesses equally over the array elements, contention will be rare (and can be controlled by controlling the ratio of array size to number of processors). The total number of read lockers is the sum of the lock counts of all the indexed counts. When this is non-zero for a reader node at the head of the queue, the lock is held in read mode by at least one thread.

Figure 3:
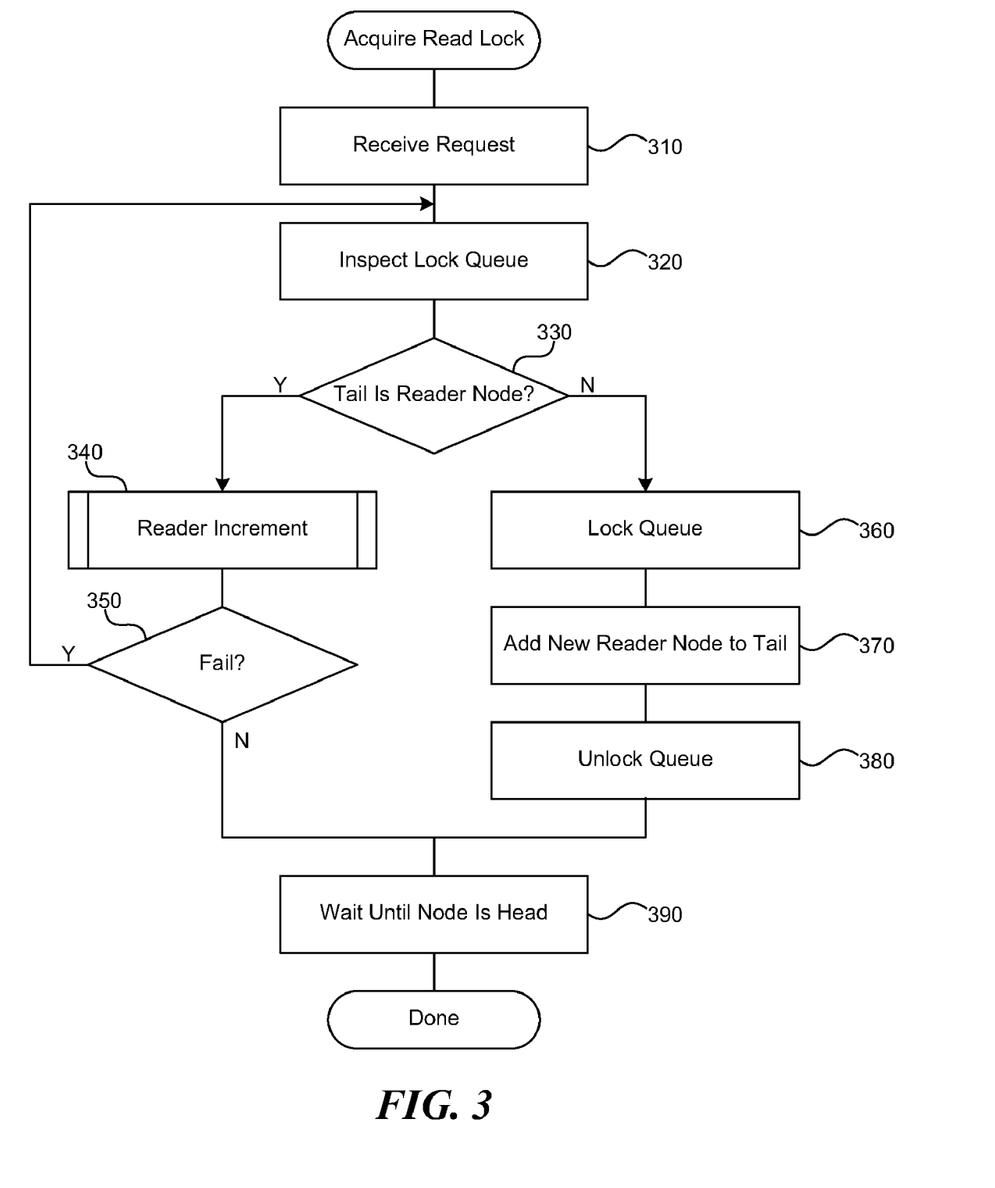
FIG. 3 is a flow diagram that illustrates processing of the system to acquire a read lock, in one embodiment.

FIG. 3 is a flow diagram that illustrates processing of the system to acquire a read lock, in one embodiment. Beginning in block 310, the system receives a request to acquire a read lock. For example, an application may call a function provided by the system for acquiring the lock in read mode. Continuing in block 320, the system inspects the queue of waiting reader and writer nodes to identify the current queue tail. For example, the system may access a tail pointer of a main lock data structure and dereference the pointer to access a node data structure at the tail of the queue. Continuing in decision block 330, if the tail node of the queue is a reader node, then the system continues at block 340, else the system continues at block 360.

Figure 4:
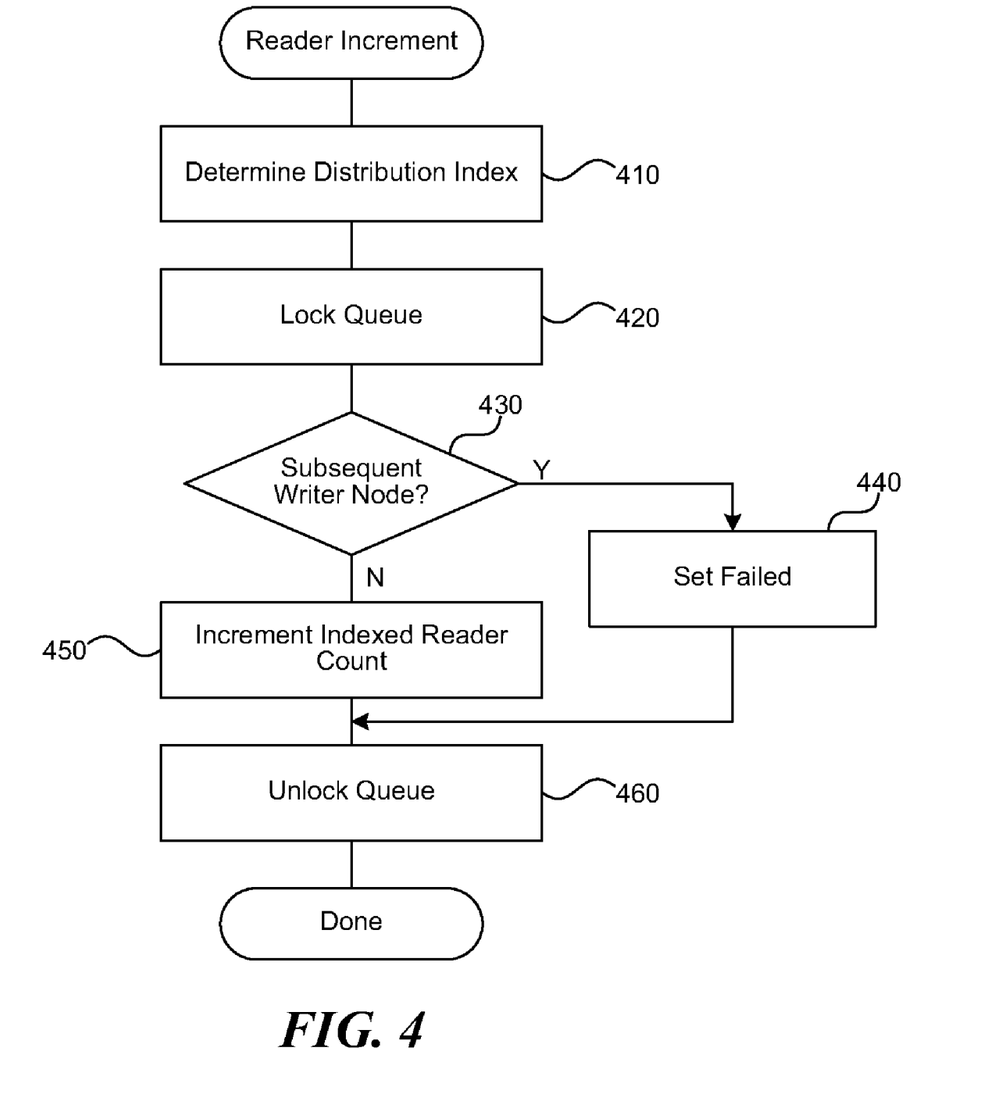
FIG. 4 is a flow diagram that illustrates processing of the system to add a new reader, in one embodiment.

Continuing in block 340 for a reader node, the system attempts to increment a reader count, as described further with reference to FIG. 4. For example, the system may acquire a queue lock and attempt to re-access the queue to update an indexed lock count. Continuing in decision block 350, if the attempt to increment the reader count failed, then the system loops to block 320 to try again, else the system continues at block 390. The increment attempt may fail, for example, if the system receives a request from a writer to acquire the lock before the reader can acquire the lock.

Continuing in block 360 for a writer node, the system locks the queue so that the system can safely read and update data members associated with the queue. For example, the system may use a data structure lock provided by the programming language (e.g., a Microsoft .NET monitor lock) or other lock for protecting internal data members of the read/write lock. Continuing in block 370, the system adds a new reader node representing the current request to acquire a read lock to the tail of the queue. For example, the system may create the new reader node by allocating it or by removing it from an object pool. Continuing in block 380, the system unlocks the queue so that other waiting threads can modify the queue. For example, the system may drop the lock acquired in block 360, or if using a monitor lock may simply exit the scope in which the lock was acquired.

Continuing in block 390, the system waits for the reader node to become the head of the queue. For example, the system may wait by spinning and if spinning fails to acquire the lock in a threshold period or number of loop iterations, the system may block waiting for a prior lock holder to awaken the thread when the prior lock holder releases the lock. The reader node becomes the head of the queue when all prior nodes in the queue complete acquiring and subsequently releasing the lock. After block 390, these steps conclude.

FIG. 4 is a flow diagram that illustrates processing of the system to add a new reader, in one embodiment. Beginning in block 410, the system determines a distribution index associated with a current thread. The system attempts to distribute which of multiple lock counts each thread increments to reduce cache contention produced by having a single lock count. The thread identifier of each thread provides a semi-random bit of information that the system may use, based on a hash algorithm or other distribution scheme common in the art, to select an index among multiple available indices within an array of lock counts.

Continuing in block 420, the system locks the queue so that the system can safely read and update data members associated with the queue. Unlike many previous read/write locks, locking the queue of the present system includes locking one of multiple lock counts to read (i.e., not a single shared lock count) and locking each of the counts to write. In this way, the same "distribution index" determines the lock that is acquired that determines which sub-counter the system increments. Distributing the lock obtained reduces cache contention among multiple logical processors. Continuing in decision block 430, if there is a writer node subsequent to the current reader node, then the system continues at block 440, else the system continues at block 450. A subsequent writer node indicates that the system has received a request to acquire the write lock. To ensure that readers do not starve writer requests (i.e., fairness), the system prevents further reader requests on the same reader node, and fails the request to increment the count. Continuing in block 440, the system sets the result of the reader increment operation to failed, and then continues in block 460.

Turning to block 450, the system increments the indexed reader count based on the determined distribution index. The indexed reader count is in a cache line isolated from other reader counts (as is the lock that protects the reader count) to reduce cache contention produced by the act of updating the reader count. Otherwise, the next time another processor read or attempted to update the reader count, the processor would experience a cache fault to load the change made by the current processor. By distributing the reader counts, the system trades space to reduce contention and increase execution efficiency. Continuing in block 460, the system unlocks the queue so that other waiting threads can modify the queue. After block 460, these steps conclude.

Figure 5:
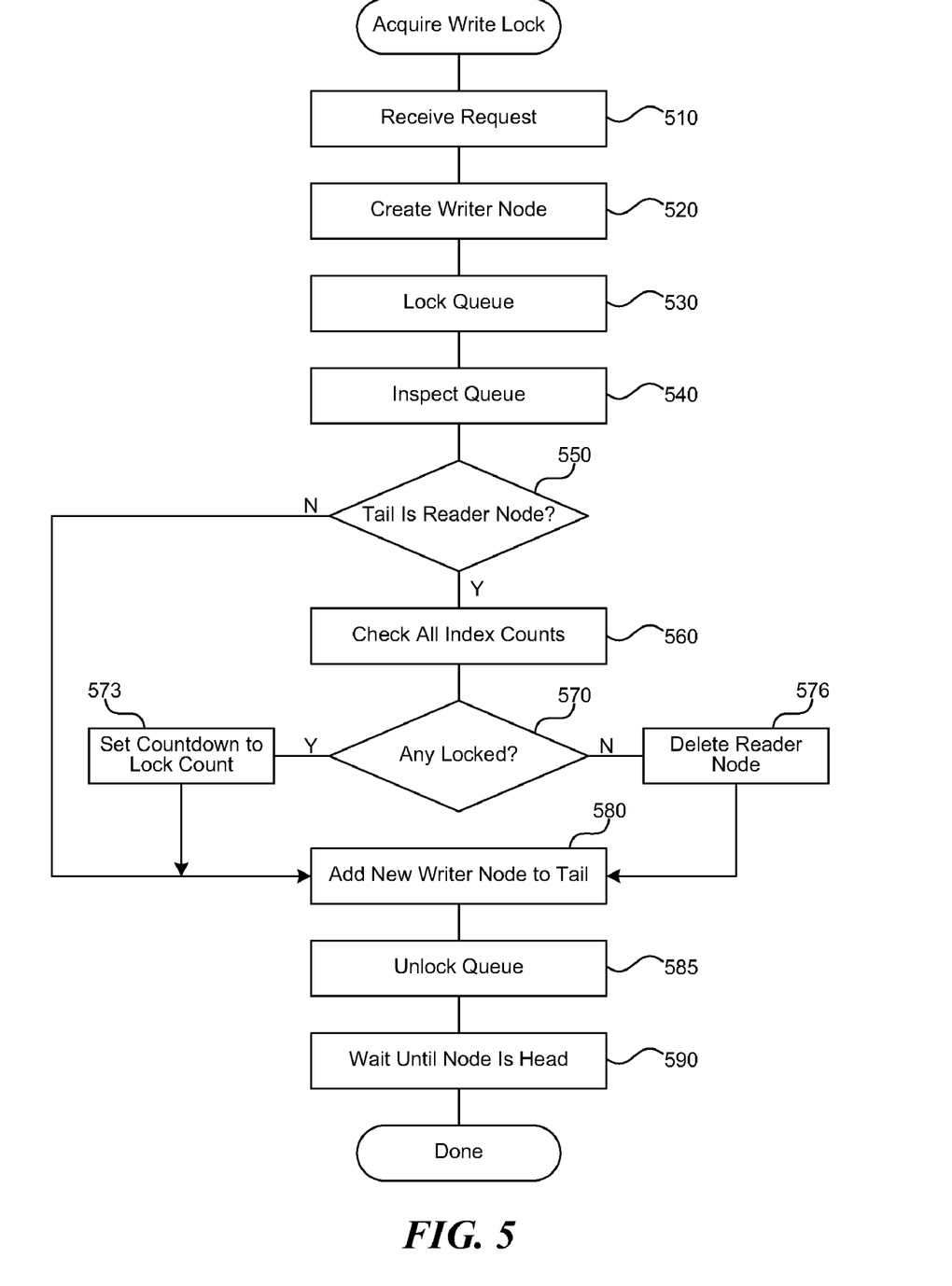
FIG. 5 is a flow diagram that illustrates processing of the system to acquire a write lock, in one embodiment.

FIG. 5 is a flow diagram that illustrates processing of the system to acquire a write lock, in one embodiment. Beginning in block 510, the system receives a request to acquire a write lock. For example, an application may call a function provided by the system for acquiring the lock in write mode. Continuing in block 520, the system creates a new writer node. For example, the system may allocate the new writer node using an allocation function or may retrieve the writer node from an object pool of reusable writer node objects.

Continuing in block 530, the system locks the queue so that the system can safely read and update data members associated with the queue. Continuing in block 540, the system inspects the queue of waiting reader and writer nodes to identify the current queue tail. For example, the system may access a tail pointer of a main lock data structure and dereference the pointer to access a node data structure at the tail of the queue. Continuing in decision block 550, if the tail node of the queue is a reader node, then the system continues at block 560, else the system jumps to block 580. Continuing in block 560, the system checks a count of readers at each of multiple indices within the reader node at the tail of the queue. Because of the way the system distributes lock requests received from readers to lock count variables in multiple cache lines to reduce cache contention, the total of the lock count variables indicates the actual number of readers. To obtain the write lock, the thread acquiring the lock locks all of the locks protecting the read counts in order to install itself as the reader node's successor in the queue. Continuing in decision block 570, if any readers hold the lock, then the system continues at block 573, else the system continues at block 576. If any of the index counts is non-zero, then at least one reader holds the lock.

Continuing in block 573, the system sets a countdown associated with the reader node to a number of remaining non-zero read counts associated with the reader node holding the lock. Turning to block 576, if the test of block 570 found no remaining readers holding the lock, then the system removes the reader node from the queue. The system may leave a reader node on the queue even though no readers currently hold the lock for the optimistic case that a next request is a request to acquire a read lock, in which case the existing reader node structure can be used without the added cost of tearing it down at the previous release and setting it back up at the next acquire request. When the next request is a write request, the system may remove the reader node at that time.

Continuing in block 580, the system adds the new writer node representing the current request to acquire a write lock to the tail of the queue. Continuing in block 5850, the system unlocks the queue so that other waiting threads can modify the queue. For example, the system may drop the lock acquired in block 530, or if using a monitor lock may simply exit the scope in which the lock was acquired to release the lock implicitly. Continuing in block 590, the system waits for the new writer node to become the head of the queue. For example, the system may wait by spinning and if spinning fails to acquire the lock in a threshold period or number of loop iterations, the system may block waiting for a prior lock holder to awaken the thread when the prior lock holder releases the lock. The writer node becomes the head of the queue when all prior nodes in the queue complete acquiring and subsequently releasing the lock. After block 590, these steps conclude.

Figure 6:
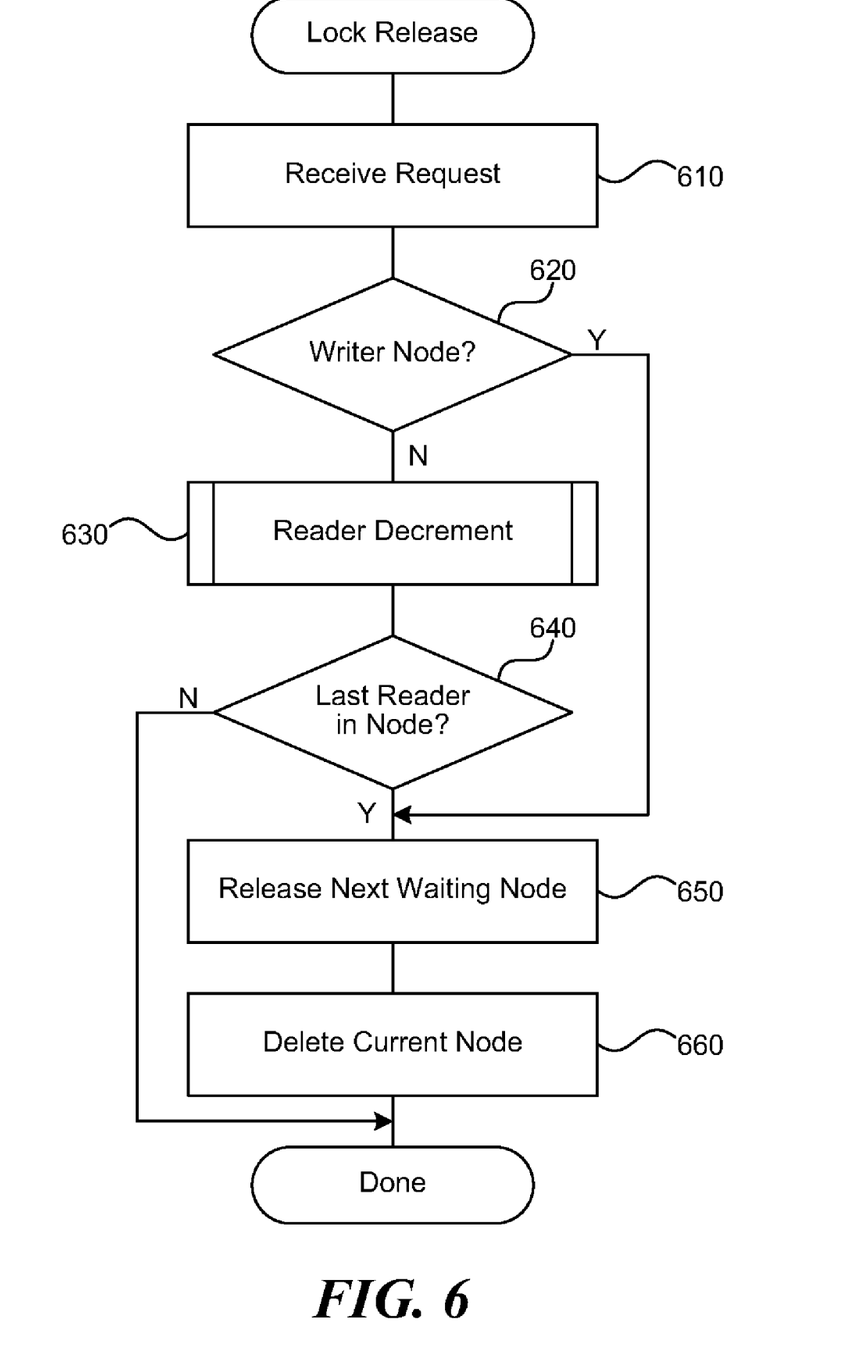
FIG. 6 is a flow diagram that illustrates processing of the system to release a read or write lock, in one embodiment.

FIG. 6 is a flow diagram that illustrates processing of the system to release a read or write lock, in one embodiment. Beginning in block 610, the system receives a request to release a previously acquired lock. For example, an application may call a function provided by the system for releasing a lock. The system as described herein expects the application to manage balancing requests to acquire the lock with requests to release the lock. However, those of ordinary skill in the art will recognize that it is a common modification to locks to use thread local storage or other techniques to allow unbalanced acquire and release requests with a locking scheme, and similar modifications can be applied to the system described herein.

Continuing in decision block 620, if the release request is for a writer node, then the system jumps to block 650, else the system continues at block 630. The system may distinguish a read lock release from a write lock release, for example, by providing separate functions for each of these two operations. Alternatively or additionally, the system may determine the appropriate type of release based on the type of node currently at the head of the queue (and thus currently holding the lock).

Figure 7:
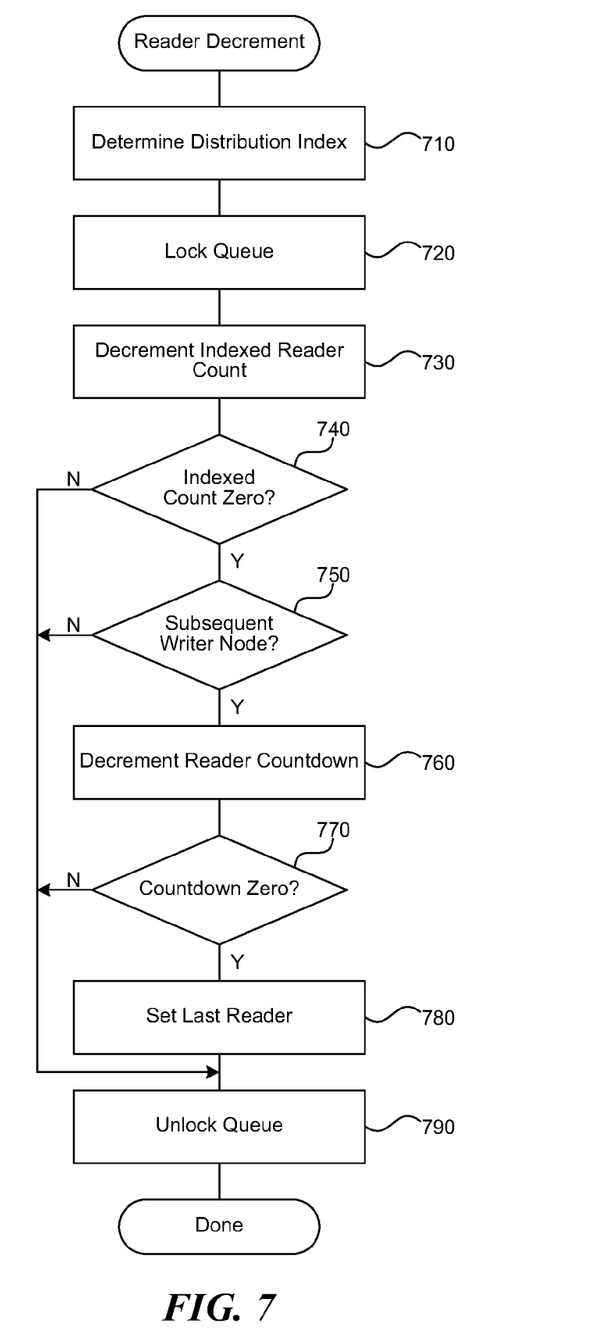
FIG. 7 is a flow diagram that illustrates processing of the system to release a reader, in one embodiment.

Continuing in block 630 for a reader node, the system decrements a reader count, as described further with reference to FIG. 7. For example, the system may acquire a queue lock and attempt to update an indexed lock count as described further herein. Continuing in decision block 640, if decrementing the reader count released the last reader associated with the reader node, then the system continues at block 650, else the system completes. As described further herein, a single reader node may represent many readers, and can be released only when each of the associated readers have released the lock. Continuing in block 650, the system releases the next waiting node in the queue subsequent to the current node. For example, the system may modify a variable that spinning waiting nodes will notice on the next loop iteration, or the system may call an operating system provided function to wake threads that went to sleep blocking for the lock to be available. Releasing the next waiting node may include removing the head node and make the waiting node, if any, the new head of the queue. The next waiting node is waiting for the condition of becoming the head of the queue to determine that the node's associated thread(s) hold the lock. The queue head value is the variable that spinning waiting nodes test to determine the lock status.

Continuing in block 660, the system deletes the current node that has been released. For example, the system may deallocate the node or return the node to a pool of nodes for later reuse. Object allocation and deallocation is often performance intensive, and particularly where objects are frequently created and destroyed can represent a large part of an application's overhead. Thus, using an object pool in conjunction with the system allows objects to be quickly reused, avoiding unnecessary setup and teardown of the objects. After block 660, these steps conclude.

FIG. 7 is a flow diagram that illustrates processing of the system to release a reader, in one embodiment. Beginning in block 710, the system determines a distribution index associated with a current thread. The system attempts to distribute which of multiple lock counts each thread increments to reduce cache contention produced by having a single lock count. The thread identifier of each thread provides a semi-random bit of information that the system may use, based on a hash algorithm or other distribution scheme common in the art, to select an index among multiple available indices within an array of lock counts. Continuing in block 720, the system locks the queue so that the system can safely read and update data members associated with the queue. There is a monitor lock associated with each lock count that is acquired in block 720. The lock and lock count are in the same cache line, so that obtaining the monitor lock does not introduce cache contention.

Continuing in block 730, the system decrements the indexed reader count based on the determined distribution index. The indexed reader count is in a cache line isolated from other reader counts to reduce cache contention produced by the act of updating the reader count. Continuing in decision block 740, if the decrement made the indexed reader count zero, then the system continues at block 750, else the system jumps to block 790. Continuing in decision block 750, if there is a writer node subsequent to the current reader node, then the system continues at block 760, else the system jumps to block 790. A subsequent writer node indicates that the system has received a request to acquire the write lock. To ensure that readers do not starve writer requests (i.e., fairness), the system prevents further reader requests on the same reader node. When the existing reader requests are finally released, the system may then wake the waiting writer.

Continuing in block 760, the system decrements a countdown of remaining readers associated with the reader node. Continuing in decision block 770, if the decrement made the countdown of remaining readers zero, then the system continues at block 780, else the system jumps to block 790. Continuing in block 780, the system sets information indicating that the last reader associated with the reader node has released the lock. The code that invoked these steps uses this information to wake any waiting subsequent node in the queue. Continuing in block 790, the system unlocks the queue so that other waiting threads can modify the queue. The system may also remove the head of the queue to allow the next node to become the head, and thus acquire the lock. After block 790, these steps conclude.

In some embodiments, the scalable lock system leaves the last reader node at the head of the queue after each reader represented by the node has released the lock. Reader node structures can be resource intensive to create and teardown, so if the last read lock is released with no pending write-lock requests, the system leaves the reader node in place at the head of the queue, ready to handle the next read-lock request.

In some embodiments, the scalable lock system provides writer and/or reader fairness. Writer fairness refers to the ability of a writer to obtain the lock even though readers continue to request the lock while some readers already hold the lock. Reader fairness refers to the ability of a reader to obtain the lock when a writer holds the lock and subsequent writers are waiting to acquire the lock. The system prevents any lock acquisition request from blocking indefinitely. The system may allow some amount of unfairness to increase throughput, but only a bounded amount—the system assures a waiting request of eventually acquire the lock.

In some embodiments, the scalable lock system provides lock upgradeability. A common feature of existing reader/writer locks is the ability to acquire a lock in an upgradeable mode—as a read lock that may optionally later be upgraded to a write lock, either through an additional interface function or by calling a function for acquiring a write lock on a thread that already has a read lock. Only one thread may hold the lock in upgradeable mode at a time (though other threads may hold the lock in read mode at the same time). To upgrade a lock, the system drains off any existing other readers to allow the current thread to upgrade to a write lock, potentially in advance of other write requests enqueued after the initial read request of the thread requesting the lock upgrade.

In some embodiments, the scalable lock system allows applications or administrators to configure the size and/or number of lock count indexes to make tradeoffs between space efficiency and the level of cache contention reduced by the system. In addition, the application may have information about the cache configuration of the system, for example, that makes a particular configuration of lock count indices more efficient.

In some embodiments, the scalable lock system dynamically determines whether to use the techniques described herein versus other available locking techniques. For example, the space used for the padding described herein may be high enough to warrant choosing a simple critical section for a sufficiently low number of processors. Thus, if the system observes that the number of processors or other attributes of the environment in which the system is used do not meet a threshold, the system may select other locking techniques that provide similar lock guarantees with more favorable performance tradeoffs. In addition, the system may perform steps to reduce memory space consumed by the lock system and minimize padding (which is often large to push read counts into separate cache lines). The system may, for example, allow multiple reader nodes on the queue to share a data structure of read lock counts. Each reader node may get a separate index in the counts to keep the data of the reader nodes separate, but each reader node would not involve a new set of padding between counts, as the same padding would serve the purpose of keeping the counts in separate cache lines.

Example Implementation

The following paragraphs present an example implementation of the system described herein. The following class illustrates a typical interface for a reader-writer lock.

```
class RWLock {
    public RWLock( );
    public ReadAcquire( );
    public ReadRelease( );
    public WriteAcquire( );
    public WriteRelease( );
}
```

Code examples given herein use the C# programming language. However, those of ordinary skill in the art will recognize that similar techniques can be performed using various other programming languages to implement the system. In the interface above, the acquire operations block until the lock is obtained in the requested mode. The release operations do not block. This example assumes that applications properly match acquires with releases of the appropriate (read/write) lock. Implementations of this interface may provide debugging aids to detect incorrect use of this interface, but such aids are outside the scope of this example.

The basic lock data structure is queue-based. The queue is a linked list of AccessNode objects, connected via an m_next field of that type. Each AccessNode is either a WriterNode or a ReadersNode. A WriterNode represents one thread attempting to acquire the lock in write mode, and a ReadersNode represents a set of one or more threads attempting to acquire the lock in read mode. As shown in the following code, the RWLock type maintains pointers to the head and tail of the queue. In response to new requests, the RWLock adds nodes at the tail, and the thread(s) associated with the node at the head hold the lock in the mode indicated by the type of the node.

```
class RWLock {
    ...
    private AccessNode m_qHead;
    private AccessNode m_qTail;
}
```

A WriterNode adds no new fields or methods to AccessNode. A ReadersNode, however, has a structure shown in the following code.

```
const int CacheLineBytes = 64;
...
[StructLayout(LayoutKind.Sequential)]
private struct ReadLockElemStruct {
    public int m_lockCount;
    // Pad with enough bytes to avoid false sharing.
    private fixed byte
        m_paddingAfter[CacheLineBytes – sizeof(int)];
}
private class ReadLockElem {
    public ReadLockElemStruct m_s;
}
private class ReadersNode: AccessNode {
    private ReadLockElem[ ] m_arr;
    private int m_countDown;
    public int m_idx;
    ...
}
```

This code utilizes several features of C# and .NET that may not be familiar. The notation "[StructLayout(LayoutKind.Sequential)]" indicates that the struct type being defined has its fields laid out in the order indicated. Without this constraint, the runtime system is free to lay out fields in any order. The "fixed" notation indicates an array laid out "inline" in the struct. The result is a struct with one int field, then enough padding bytes to fill out a cache line. Although 64 bytes is shown as the size of the cache line in the example code, this size may vary by implementation and processor hardware used. In C# and Microsoft .NET, objects (e.g., instances of class types) contain implicit monitor locks, but struct types do not. This example assumes lockable instances of this struct type, so the ReadLockElem class is created, which has one field of this struct type. In the common case, .NET monitor locking is accomplished with reads and writes to a "header word" at the start of an object. This example relies on one more feature of the Microsoft .NET implementation: if a single thread allocates several ReadLockElem instances consecutively, they are likely to be allocated contiguously in memory (and if they are not, they are highly likely to be allocated as only two contiguous sequences, with a somewhat random gap between). The ReadersNode type contains an array of ReadLockElem instances initialized with consecutively allocated instances. In each of these structures, the functions described herein are likely to access the object header word and the m_lockCount field, but the padding bytes ensure that in a contiguous sequence of ReadLockElem instances, these words will be on different cache lines for each object. The functions of the m_countDown and m_idx fields will be explained further herein.

The example implementation obeys the following rules to manage concurrency. First, a thread can only modify the m_qHead and m_qTail fields of an instance of the RWLock class when it holds the monitor lock on that instance. Second, the m_lockCount field of a ReadLockElem instance can only be accessed by a thread that holds the monitor lock on that instance. Third, the m_next field of an AccessNode is null when the node is allocated, and makes a single transition to a non-null value in its lifetime. This transition is only performed by threads that hold the monitor lock on the top-level RWLock. In addition, for a given ReadersNode instance the system ensures that the thread causing this transition hold the monitor locks on all the ReadLockElem instances pointed to by the m_arr member of the given instance. Finally, the m_countDown member of a ReadersNode instance is zero when the object is allocated. After that, m_countDown may make a single transition from zero to a non-zero value; as with the m_next field's null-to-non-null transition, only a thread that holds the locks on all the ReadLockElems of the instance performs the transition. After the transition to a non-zero value, threads may decrement the value back towards zero. The system uses atomic hardware instructions (in a loop) for these decrements. The use of these rules to justify concurrency safety is pointed out further herein.

The first method described is ReadAcquire. Following is example code for implementing this method as discussed further herein.

```
public void ReadAcquire( ) {
    Thread curThrd = Thread.Current;
    while (true) {
        AccessNode an = m_qTail;
        if (an != null && an is ReadersNode) {
            ReadersNode rn = (ReadersNode)an;
            if (!rn.IncLockCountForThread(curThrd))
                continue;
            WaitUntilHead(rn);
        } else {
            ReadersNode rn = AllocReadersNode( );
            rn.IncLockCountForThread(curThrd);
            lock (this) {
                an = m_qTail;
                if (an == null) {
                    m_qHead = m_qTail = rn; return;
                } else if (an is ReadersNode) {
                    rn.DecLockCountForThread(curThrd);
                    DeallocReadersNode(rn);
                    continue; // try again.
                } else { // an is a writer node.
                    an.m_next = rn;
                    m_qTail = rn;
                }
            }
            WaitUntilHead(rn);
        }
        return;
    }
}
```

As shown, acquiring the read lock includes a loop, since lock-free techniques may include retrying several times. In the loop, the function reads (with no locking) the current queue tail. If the tail is a non-null ReadersNode, the current thread will attempt to increment the lock count for its element. The danger of using the "dirty read" is that the node may be deleted from the queue between that read and the operations done on the node. The IncLockCountForThread operation handles that situation, as will be discussed, and returns a Boolean value indicating whether the increment was successful. If the return value is false, the ReadersNode was closed to further read locking by a subsequent write-locking thread. In this case, the function retries the loop. If the increment operation is successful, then the thread waits for the tail node in which it incremented a lock count to become the head node of the queue (the WaitUntilHead operation is described in more detail below).

If the observed tail node of the queue is not a ReadersNode, then the function allocates a new readers node to append to the queue. This node will have null m_next, zero m_countDown, and an m_arr field initialized to an array containing pointers to (contiguously allocated) ReadLockElem instances with lock count zero. No thread on the new node or its sub-objects will hold any monitor locks. The system increments the lock count for the current thread in this ReadersNode—with no locking, since the newly allocated node is still thread-local. Next, the function locks the RWLock, since it is going to modify the queue structure. The function then reads the m_qTail field while holding the lock. If result is null, the queue is empty, so the function creates a one-element queue. The new ReadersNode is at the head of the queue, so the operation can return, since the current thread has acquired a read lock. Otherwise, if the locked read of the tail determines the tail now to be a ReadersNode, the function undoes the lock count increment, deallocates the node (the system may use an "object pool" to speed allocation of ReadersNode instances), and re-executes the loop. Finally, if the observed head is non-null and is not a ReadersNode, it is a WriterNode, so the function sets the m_next field of that tail node to the new ReadersNode (recall that the m_next field of a WriterNode may be modified while holding the lock on the entire RWLock, which is true at this point), and updates m_qTail (which is also justified by the lock statement on the RWLock).

Following are example implementations of the IncLockCountForThread and WaitUntilHead helper functions used in the discussion above.

```
// Helper functions
public bool IncLockCountForThread(Thread t) {
    int id = t.GetHashCode( );
    int ind = id % NProcs;
    ReadLockElem rle = m_arr[ind];
    lock (rle) {
        // If we have a waiting writer, can't increment.
        if (m_next != null) return false;
        // Otherwise...
        rle.m_s.m_lockCount++
        return true;
    }
}
private void WaitUntilHead(AccessNode an) {
    for (int k = 0; k < SpinCount; k++) {
        if (an == m_qHead) return;
        Spin(1);
    }
    lock (an) {
        while (an != m_qHead) {
            Monitor.Wait(an);
        }
    }
}
```

IncLockCountForThread starts by obtaining the locking thread's hash code, which is distributed evenly over the 32-bit integers, and using a modulus operation to get an index in the interval [0::NProc), where NProc is the size of a ReadersNode instance's array of ReadLockElem structures. The function then reads the given array element, obtaining the proper ReadLockElem instance for the locking thread. The function locks this ReadLockElem instance and checks whether the ReadersNode instance's m_next field is non-null. If the m_next field is non-null, then a subsequent WriterNode already enqueued, and the current ReadersNode is closed to further read locking; the function returns false to indicate this condition. Otherwise, m_next is null, and will remain so while the lock is held (relying on the rule that all such locks are acquired in order to change the m next field of a ReadersNode). The function can therefore increment m_lockCount to increase the total number of read-locking threads (access to m_lockCount is justified by holding the lock on the containing ReadLockElem), and return true to indicate success.

The WaitUntilHead function starts with some amount of spin waiting. This loop will perform some number of iterations, each of which will perform a dirty (unlocked) read of the RWLock's m_qHead field, and test whether the current thread's node is at the head. If so the function returns; if not, the function calls Spin to do some amount of busy work, and ends the loop. Performing the dirty read of m_qHead helps performance: if a lock were forced to observe this, the locking would create a contended cache line. Fortunately, it is safe to do the dirty read here, since the predicate we are waiting to observe is "stable for current thread:" if it becomes true, it can only be falsified by an action of the current thread. In this case, if the current thread's AccessNode becomes the head of the queue, then it will remain at the head of the queue at least until the current thread releases its lock.

With proper tuning of the SpinCount parameter and the amount of busy work done in the Spin routine, the function can acquire many locks without blocking. Of course, spinning too much can lead to excessive wasted work, especially when there are more runnable threads than processors. These tradeoffs are standards with locks that balance spin waiting and blocking, and are familiar to those of ordinary skill in the art. When spin waiting fails, the function starts a standard monitor wait loop. The function locks the current thread's AccessNode, and then enters a loop that waits for the AccessNode to become the queue head. Again, the read here of m_qHead is dirty, as before, but is justified by the same observation. The Monitor.Wait(an) operation releases the monitor lock on the AccessNode and waits for some other thread to do a Pulse or PulseAll operation on the AccessNode (the Microsoft .NET platform calls this Pulse; other platforms use the name Notify). The system is careful that all operations that change the queue head perform this wakeup operation.

We next describe the method for acquiring a write lock; considering the operations in this order will make certain aspects of releasing a read lock clearer. The following code illustrates one implementation of a function for acquiring the write lock.

```
public void WriteAcquire( ) {
    WriterNode wn = new WriterNode( );
    lock (this) {
        AccessNode an = m_qTail;
        if (an == null) {
            m_qHead = m_qTail = wn; return;
        } else if (an is WriterNode) {
            an.m_next = wn;
            m_qTail = wn;
        } else {
            ReadersNode rn = (ReadersNode)an;
            if (rn.InstallWriterSuccessor(wn)) {
                m_qHead = m_qTail = wn;
                DeallocReadersNode(rn);
                return;
            } else {
                m_qTail = wn;
            }
        }
    }
    WaitUntilHead(wn);
}
```

The function first allocates a new WriterNode. In contrast with ReadAcquire, WriteAcquire immediately locks the RWLock and reads the queue tail. If the queue tail is null, the function sets up a single-node queue and returns, indicating that the current thread owns the write lock. Otherwise, if the non-null tail node is a WriterNode, the function makes the new WriterNode the new tail, and falls through to release the lock on the RWLock and waits until the new WriterNode is the queue head. If these tests fail, then the tail node is a ReadersNode. In this case, the function calls InstallWriterSuccessor to close the ReadersNode to further read locking, make the argument node WriterNode the successor of the ReadersNode, and return a Boolean value indicating whether the total lock count of the ReadersNode was zero. This can only be true if the ReadersNode is at the head of the queue: in ReadAcquire every ReadersNode has a total lock count greater than zero when it becomes part of the queue, and the total lock count is only decremented by lock releases, which happen only after acquires return, which happens only when the corresponding node becomes the queue head. Therefore, if InstallWriterSuccessor returns true, WriteAcquire can create a single-node queue, deallocate the former queue head, and return immediately indicating that the current thread has acquired the lock in write mode. Otherwise, if InstallWriterSuccessor returns false, WriteAcquire completes the queue append by making the WriterNode the new tail of the queue, and again falls through to release the lock and wait for the WriterNode to become the queue head.

Following is an example implementation of the InstallWriterSuccessor helper function of the ReadersNode class used in the discussion above.

```
public bool InstallWriterSuccessor(WriterNode wn) {
    int nonZeroLCs = 0;
    for (int i = 0; i < NProcs; i++) {
        Monitor.Enter(m_arr[i]);
        if (m_arr[i].m_s.m_lockCount > 0) nonZeroLCs++;
    }
    m_countDown = nonZeroLCs;
    m_next = wn;
    for (int i = 0; i < NProcs; i++) {
        Monitor.Exit(m_arr[i]);
    }
    return (nonZeroLCs == 0);
}
```

InstallWriterSuccessor initializes a variable (nonZeroLCs) that will count the number of ReadLockElem instances with non-zero lock counts. Next, a loop acquires the monitor locks on all the ReadLockElem instances in the ReadersNode (in ascending index order, which prevents deadlocks if multiple threads execute this method concurrently). After the monitor lock has been acquired, the function reads the lock count (obeying the locking discipline for accessing the lock count), and if it is non-zero, increments the nonZeroLCs variable. When all the locks have been acquired, the function initializes the m_countDown and m_next fields to possibly non-zero and non-null values. Note that this code obeys the locking discipline described for these transitions since all the ReadLockElem monitor locks for the ReadersNode are held. After this, the subsequent loop releases all the ReadLockElem monitor locks (order is irrelevant here), and then the method returns a Boolean indicating whether the number of non-zero lock counts observed was zero.

The following code shows an example implementation of the ReadRelease function for releasing a read lock held by a thread.

```
public void ReadRelease( ) {
    ReadersNode rn = (ReadersNode) m_qHead;
    if (rn.DecLockCountForThread(Thread.CurrentThread)) {
        ReleaseHead( );
        DeallocReadersNode(rn);
    }
}
public bool DecLockCountForThread(Thread t) {
    int id = t.GetHashCode( );
    int ind = id % NProcs;
    ReadLockElem rle = m_arr[ind];
    lock (rle) {
        int lc = (--rle.m_s.m_lockCount);
        if (lc == 0) {
            if (m_next != null) {
                if (Interlocked.Decrement(ref m_countDown) == 0)
                    return true;
            }
        }
    }
    // Otherwise...
    return false;
}
```

The discussion herein has assumed that releases are balanced, so that a thread executing ReadRelease has last executed a successful ReadAcquire operation on the RWLock. Therefore, ReadRelease may assume that the head node of the lock's queue is a ReadersNode whose total lock count includes a contribution from the current thread, and is therefore non-zero. The DecLockCountForThread function finds the array index for the decrementing thread, reads the corresponding ReadLockElem instance, and locks the ReadLockElem. DecLockCountForThread decrements the lock count of the ReadLockElem instance and checks whether the new lock count is zero. If the new lock count is zero, then the function checks whether the ReadersNode has a non-null m_next field. If the m_next field is non-null, then a previous execution of InstallWriterSuccessor has initialized m_next and m_countDown, thus closing this node from further read locking. The return value of the DecLockCountForThread function is true only if the ReadersNode on which it is executed has a WriterNode successor, and its total lock count is now zero, so the successor can become the new queue head. Therefore, the function uses an atomic hardware instruction to decrement m_countDown, and if the post-decrement value returned is zero, the function returns true. Otherwise, the function returns false.

In ReadRelease, if the call to DecLockCountForThread returns true, ReadRelease calls ReleaseHead to remove the head node from the queue. This general method calls PulseAll on the new queue head node, if there is one. Finally, ReadRelease deallocates the removed node (e.g., as part of an object-pooling scheme for ReadersNode instances).

The WriteRelease method is not shown, since it only includes a call to the same ReleaseHead method called by ReadRelease. The details of ReleaseHead impact performance as described further herein. The following code is an example implementation of the ReleaseHead function.

```
private void ReleaseHead( ) {
    AccessNode newHead = m_qHead.m_next;
    if (newHead == null) {
        lock (this) {
            if (m_qTail == m_qHead) {
                m_qHead = null; m_qTail = null;
                return;
            }
        }
    }
    newHead = m_qHead.m_next;
    m_qHead = newHead;
    lock (newHead) {
        Monitor.PulseAll(newHead);
    }
}
```

Note that only the thread that completes the release of the lock(s) corresponding to the queue head calls ReleaseHead—no other thread can call this method until ReleaseHead changes the queue head. This justifies the unlocked read of m_qHead in ReleaseHead, since only the current thread can change m_qHead. The m_next field of the queue head is also read without locking. By the concurrency rules described herein, if the test of m_next determines that the next pointer is non-null, its value is stable and can be read without locking. If m_next is null, however, m_next may change to a non-null value if another thread enqueues a new node after m_next. Thus, ReleaseHead acquires the monitor lock on the RWLock in this case, which it holds in order to perform this transition by the concurrency control rules. ReleaseHead then performs a "double-check" idiom, reading the queue head and tail again while holding the lock to verify that the queue has a single element. If so, then the method resets the queue to the empty state, and the method returns. If this test fails, the queue had more than one element, so the function falls through and releases the lock—when the successor of the head is then read it is guaranteed to be non-null. The function then updates the queue head. Immediately after this write, other threads doing spin waiting may observe that their node is at the head of the queue, and determine that they therefore own the lock. However, the current thread has already identified the newHead queue node whose thread(s) it is responsible for waking if they have blocked, so it pulses those objects.

From the foregoing, it will be appreciated that specific embodiments of the scalable lock system have been described herein for purposes of illustration, but that various modifications may be made without deviating from the spirit and scope of the invention. Accordingly, the invention is not limited except as by the appended claims.

I claim:

1. A computer-implemented method for acquiring a read lock in a multiple processor system, the method comprising:
receiving a request to acquire a read lock;
inspecting a queue of waiting reader and writer nodes to identify a current queue tail, wherein a node at the head of the queue represents one or more threads that currently hold the lock and wherein new requests to acquire the lock are added at the current queue tail;
upon determining that the current queue tail is a reader node, incrementing a reader count by performing the following:
    determining a distribution index associated with a current thread, wherein the distribution index distributes received read lock requests to multiple lock counts to reduce cache contention versus a single lock count;
    incrementing an indexed reader count based on the determined distribution index; and
waiting for the reader node to become the head of the queue, and in response to the reader node becoming the head of the queue responding to the request indicating the lock is acquired,
wherein the preceding steps are performed by at least one processor.

2. The method of claim 1 wherein determining a distribution index comprises performing a hash function on a thread identifier of a current thread and determining a modulus of a hash result based on a number of lock counts.

3. The method of claim 1 further comprising, before incrementing the indexed reader count, determining whether the queue contains a writer node subsequent to the current reader node, and in response to determining that the queue contains a subsequent writer node, retrying the read lock request to ensure that readers do not starve writer requests.

4. The method of claim 1 wherein the indexed reader count is in a cache line isolated from other reader counts to reduce cache contention produced by the act of updating the reader count.

5. The method of claim 1 wherein the indexed reader count is offset from other reader counts by an amount of padding equal to or greater than a cache line width of a processor of the multiple processor system.

6. The method of claim 1 wherein waiting for the reader node to become the head of the queue comprises spinning for a threshold period and if the reader node does not become the head of the queue during the threshold period blocking waiting for a prior lock holder to release the lock.

7. A computer system for providing a reader/writer lock having favorable cache contention characteristics, the system comprising:
   a processor and memory configured to execute software instructions;
   an interface component configured to provide an interface to application code and receive requests to acquire and release locks in both a read mode and a write mode;
   a queue component configured to maintain a list of reader and writer nodes that represent requests to acquire a lock and any current holder of the lock;
   a reader state component configured to maintain an indexed list of reader lock counts for one or more reader nodes in the list maintained by the queue component, wherein the indexed list is structured so that lock counts are distributed with enough space between each count so that accessing a lock count at one index location is associated with a different cache line than accessing a lock count at any other index location;
   a blocking component configured to allow threads to block waiting for the lock efficiently and wake threads in response to a particular thread releasing the lock; and
   a node allocation component configured to allocate new reader and writer nodes for inclusion on the list maintained by the queue component.

8. The system of claim 7 wherein the interface component is further configured to provide a programmatic interface to applications through Microsoft .NET that includes a class with one or more functions that an application can invoke to acquire and release read and write locks.

9. The system of claim 7 wherein the queue component is further configured to store a node associated with the current holder of the lock at the head of the list and wherein each subsequent node in the list represents a next in line request to receive the lock after the current holder of the lock releases the lock.

10. The system of claim 7 wherein the queue component is further configured to provide lock fairness by enforcing acquisition of the lock based on an order of received requests to ensure that one type of request will not prevent another type of request from acquiring the lock.

11. The system of claim 7 wherein the reader state component prevents cache contention in response to a thread running on one processor modifying a lock count because of acquiring or releasing a read lock.

12. The system of claim 7 wherein the reader state component distributes the lock counts according to a scheme based on a number of processors associated with the system.

13. The system of claim 7 wherein the reader state component distributes the lock counts according to a scheme based on a number of threads using the lock.

14. The system of claim 7 wherein the blocking component is further configured to spin for a threshold number of loops before putting a thread to sleep to be awoken when the lock is available and wherein in response to the lock being released by a current lock holder, the blocking component wakes a thread of the next node in the list maintained by the queue component indicating that the thread has the lock.

15. The system of claim 7 wherein the node allocation component is further configured to use object pooling to provide efficient creation and destruction of nodes.

16. A computer-readable storage medium comprising instructions for controlling a computer system to release a read/write lock, wherein the instructions, when executed, cause a processor to perform actions comprising:
   receiving a request to release a previously acquired read lock;
   determining a distribution index associated with a current thread;
   decrementing an indexed reader count based on the determined distribution index, wherein the indexed reader count is in a cache line isolated from other reader counts to reduce cache contention produced by updating the indexed reader count;
   determining whether there is a writer node subsequent to a current reader node associated with the previously acquired read lock;
   determining that a total of all indexed reader counts associated with the current reader node is zero; and
   in response to determining that there is a writer node subsequent and that the total of all indexed reader counts is zero, releasing the next waiting node in the queue subsequent to the current reader node.

17. The medium of claim 16 wherein determining a distribution index comprises identifying a distribution index determined when the read lock was previously acquired to increment the lock count.

18. The medium of claim 16 wherein releasing the next waiting node comprises modifying a variable that spinning waiting nodes will notice on the next spin loop iteration.

19. The medium of claim 16 wherein releasing the next waiting node comprises calling an operating system provided function to wake threads that went to sleep blocking for the lock to be available.

* * * * *